United States Patent [19]

Heinze

[11] Patent Number: 5,751,385
[45] Date of Patent: May 12, 1998

[54] SUBTRACTIVE COLOR LCD UTILIZING CIRCULAR NOTCH POLARIZERS AND INCLUDING A TRIBAND OR BROADBAND FILTER TUNED LIGHT SOURCE OR DICHROIC SHEET COLOR POLARIZERS

[75] Inventor: William C. Heinze, Glendale, Ariz.

[73] Assignee: Honeywell, Inc., Minneapolis, Minn.

[21] Appl. No.: 255,031

[22] Filed: Jun. 7, 1994

[51] Int. Cl.$^6$ .................... G02F 1/1335; G02F 1/1347
[52] U.S. Cl. .................... 349/61; 349/74; 349/80; 349/97; 349/98
[58] Field of Search .................... 359/53, 65, 63, 359/73, 37; 349/1, 74, 78, 80, 98, 117, 61, 97

[56] References Cited

U.S. PATENT DOCUMENTS

| | | | |
|---|---|---|---|
| 4,073,571 | 2/1978 | Grinberg et al. | 359/37 |
| 4,726,663 | 2/1988 | Buzak | 359/53 |
| 5,032,007 | 7/1991 | Silverstein et al. | 359/53 |
| 5,122,887 | 6/1992 | Mathewson | 359/53 |
| 5,221,982 | 6/1993 | Faris | 359/53 |
| 5,325,218 | 6/1994 | Willett et al. | 359/53 |
| 5,548,422 | 8/1996 | Conner et al. | 359/73 |

FOREIGN PATENT DOCUMENTS 2-272431  11/1990  Japan .................... 359/63

WO94/15355  7/1994  WIPO .

OTHER PUBLICATIONS

*IEEE Transactions on Electron Devices*, Feb. 1974, vol. ED-21, No. 2, ISSN 0018-9383, "Liquid Crystal Color Light Valve" (Sato, et al.).

*Patent Abstracts of Japan*, vol. 17, No. 643, (P-1651), dated 29 Nov. 1993, JP5210082 (Semiconductor Energy Lab Co. Ltd.), 20 Aug. 1993.

Häberle et al., "Crosslinkable Cholesteric LC-Silicones", Record of the International Display Research Conference, pp. 57–59, 1991.

*Primary Examiner*—William L. Sikes
*Assistant Examiner*—Walter J. Malinowski
*Attorney, Agent, or Firm*—Kenneth J. Johnson; Charles J. Ungemach; Ronald E. Champion

[57] ABSTRACT

A subtractive color liquid crystal display employing circular polarizers. In the subtractive color display each picture element has three liquid crystal switching elements. Adjacent to each liquid crystal switching element are a circular polarizer and ¼ wave retarder plate combination. The circular polarizer and ¼ wave retarder plate combination create a linear notch polarizer for an isolated and steep polarization band for each of the primary colors (red, green blue). The notch polarizes are tuned to the particular backlight of the display in order to provide increased light transmittance and color gamut.

20 Claims, 17 Drawing Sheets

LAMP A 300 WATT BROAD BAND LAMP

SUBTRACTIVE COLOR LCD UTILIZING CIRCULAR NOTCH POLARIZERS AND INCLUDING A TRIBAND OR BROADBAND FILTER TUNED LIGHT SOURCE OR DICHROIC SHEET COLOR POLARIZERS

BACKGROUND OF THE INVENTION

Previous segmented or matrix display technologies used for generating full-color alphanumeric, graphic and/or television type video image have relied on additive color synthesis via high-density arrangements of small red (R), green (G), and blue (B) primary color pixels.

Color encoding has become a common feature in visual information displays. Although many types of color display systems and applications presently exist, there are many potentially useful applications of color which have not been developed due to limitations and existing color display technology. Virtually all existing color displays are additive color systems, in that full color is produced by either the spatial integration of very small primary color points (i.e. very small R,G and B pixels), or the temporal integration of sequentially presented image fields of alternating primary colors.

Both of these additive approaches to color synthesis have significant limitations. Spatial additive color synthesis requires high pixel density or resolution, since the projected angle substended by small primary color elements (i.e. R,G and B pixels) must be encompassed within the spatial integration zones of human visual system. If primary color elements are too large, then complete color synthesis will fail to occur and color fringes or patterns will be apparent in the image. The requirement for three "populations" of spatially separated primary color elements to produce a full-color image, as in the shadowed-mask cathode ray tube, results in a reduction of available image sampling resolution of the display device. For applications requiring full color and very high image resolution, such as systems for the display of sensor video information, spatial additive approaches to color synthesis are generally not feasible due to the resultant losses in image sampling resolution. In addition, many applications for color information displays require only low image resolution such as color-coded alphanumeric or symbolic displays. For low-resolution displays, a spatial additive color technology is generally not appropriate since relatively high pixel resolution or density is required for adequate color synthesis even though image resolution requirements are substantially lower. High pixel density usually incurs high costs, and many potentially useful applications of color in low resolution displays remain undeveloped due to the relatively high cost of spatial additive color display technology.

Temporal color synthesis does not rely on three "populations" of spatially separated R,G and B pixels to produce a full-color image but rather achieves color synthesis by rapid sequential alternation of primary color images. This approach to color synthesis does not degrade image resolution as does spatial color synthesis. Full color control is effectively achieved at each individual image pixel. Temporal synthesis is generally implemented by a broad-band image forming source passing light sequentially in time through color filters (typically R,G and B). The image forming source must be synchronized with three color filters such that appropriate parts of the image within an intended color are displayed while the respective filter or filters are in front of the image forming source. The most popular imitations of such "frame-sequential" color display systems are typified by the use of a cathode ray tube with a broad band phosphor, (i.e. emitting white light) as the image forming source and a rotating color wheel containing R,G and B filters as the color rendering component. More recently, the color wheel has been replaced by a non-mechanical component consisting essentially of a liquid crystal (LC) switchable optical polarizer and several layers of polarized color filter films.

The disadvantages of color display systems which use temporal color synthesis are rooted in the fact that, in such systems, the individual primary color image fields are separated in time and are only present for one-third of the total display viewing period. Since three color image fields must be presented in the same amount of time as a single field in a spatial additive color display or monochromatic display, frame-sequential displays require an extremely high system bandwidth in order to produce a full-color image at a refresh rate high enough to minimize image flicker. Even with high system bandwidths and full-color refresh rates equivalent to monochromatic or spatial additive color displays, frame-sequential color displays are prone to image flicker due to the luminance modulation existing between sequential color image fields. A more important limitation of the temporal synthesis approach to color mixture, however, is the mixture colors are often observed to smear or separate into their individual primary color image components during motion of either the display image or the observers eye.

An alternative to these additive approaches is subtractive color. In subtractive each picture element in a display is made up of three stacked switching elements and color filters for each of the primary colors. White light is transmitted through the switching elements portions of the primary colors are filtered out until the desired color is emitted from the stack. Each switching element is individually actuable to control the color content and image makeup.

In one subtractive color scheme, three guest/host liquid crystal cells each containing a different dichroic guest dye (typically magenta (minus G), cyan (minus R) and yellow (minus B) dyes) are stacked in registration along with associated structural components and optical components (e.g. polarizers and/or fiber optic plates). The cells include pattern electrodes (and for some applications integral sample-and-hold features such as thin film transistors (TFT) at individual pixels) when the device is configured as either a low or high resolution full-color display or a uniform electrode layer when the device is configured as a simple electronic color filter. When the device is configured as a color display, only a broad band source of illumination is required for full-color image presentation. In the simple electronic color filter configuration, the device is used in conjunction with a broad band image forming source, such as a cathode ray tube with white-emitting phosphor or a back-lit pattern illuminator with broad-band lamp.

In another type of subtractive liquid crystal color display, the display is comprised of first, second and third subtractive LCD filters, each filter comprising means for independently subtracting one of the primary colors from a polychromatic light beam, without substantially affecting the other subtractive colors. Each of the subtractive LCD filters combines wavelength selective dichroic polarizers with a liquid crystal cell to provide a filter that can selectively subtract varying amounts of incident spectral radiant energy from within one of three primary energy bands. In prior art subtractive filters, it has been shown that either twisted nematic (TN) or super twisted nematic (STN) can be used as the active switching element.

The prior art subtractive color displays usually incorporate sheet type colored polarizers which are commercially available. These are usually made of thin sheets of glass or plastic which are embedded with a parallel aligned dichroic dye in order to polarize a particular band of the visible spectrum. A disadvantage of this type of polarizer is that it leaks appreciable amplitudes of non-selected primary colors restricting color purity and color gamut causing a chromaticity shift during grayscale dimming of a select color. In addition, dichroic polarizers are broadly absorbing, and when utilized in combination to improve color purity, they severely restrict transmission because of overlap of the broad polarization bands. For example, a cyan polarizer in the ideal case should only polarize red, and transmit 100% of green and blue wavelengths. A typical cyan dichroic polarizer polarizes red but only transmits 30% of green and 50% or blue. The overlapping in a subtractive color system is critical because red, green, and blue light is developed in series and the overlap of the magenta, yellow and cyan polarizers multiply their transmission losses. Also, the individual cyan, magenta and yellow polarizers transmit unequal portions of their pass band wavelengths. When many of these polarizers are combined to produce a broad color gamut, the result is that the white state transmission is low, and the transmission of some of the individual select colors is much lower than the white state transmission. Therefore, in addition to low transmission, red select, green select, and blue select added together do not equal the white select spectra and luminance as they would in an ideal system.

Therefore, it is an object of this invention to provide a subtractive color with improved transmission qualities, color gamut, and grayscale.

SUMMARY OF THE INVENTION

Disclosed herein is a subtractive color liquid crystal display employing circular notch polarizers. The display is comprised of an illumination means which emits light that is incident upon a plurality of picture elements which act to filter the light. Each picture element is comprised of three active switching elements which selectively rotate the polarization of the incident light. On either side of each of the switching elements are notch polarizers tuned to the light source which polarize isolated bands of incident light. The notch polarizers are comprised of at least one circularly notch polarizing layer for a particular primary color and a ¼ wave retarder plate. The circular notch polarizer and the ¼ wave retarder plate combine to create a linear notch polarizer for an isolated band of incident light.

The notch polarizers are tuned to polarize a particular bandwidth of incident light. This bandwidth can be expanded or contracted depending on the type of light source used. Another advantage of the notch polarizers are the steep polarization bands which significantly reduce any overlap between the filters and improve transmission and contrast. These notch polarizer filters can also be used in conjunction with dichroic dye type polarizers to greatly boost the contrast ratio, and also achieve transmission gain when compared with only using the dichroic dye type polarizers.

DESCRIPTION OF THE PREFERRED EMBODIMENT

Figure 1A:
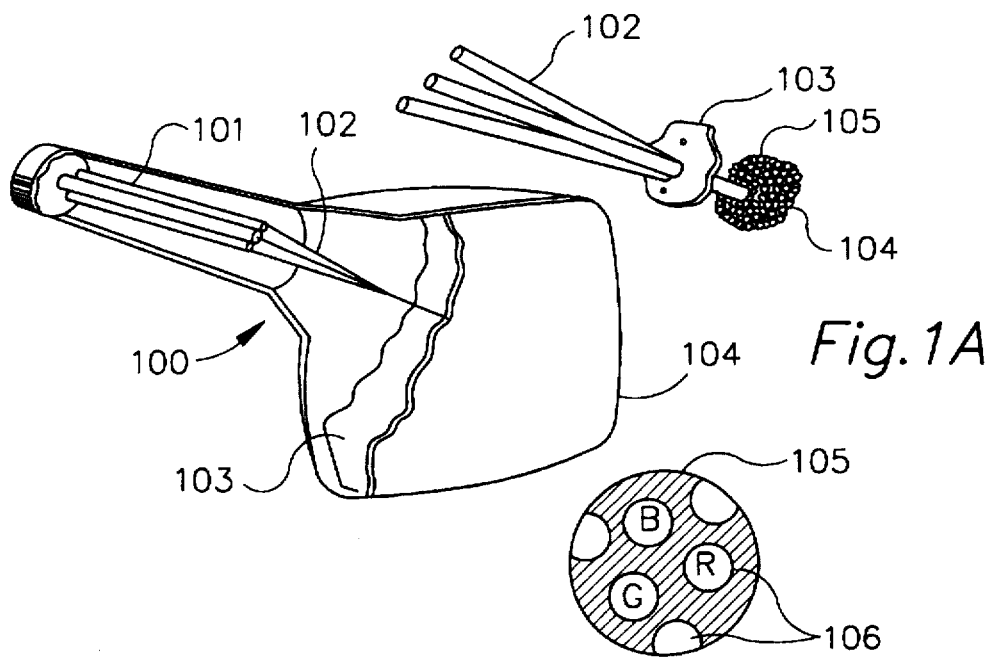
FIGS 1A and 1B show two existing approaches for producing full-color images using the spatial additive method of color synthesis: the shadow-mask color cathode ray tube (1A), and the active-matrix address liquid crystals display panel with R, G and B color filter array (1B).
Figure 1B:
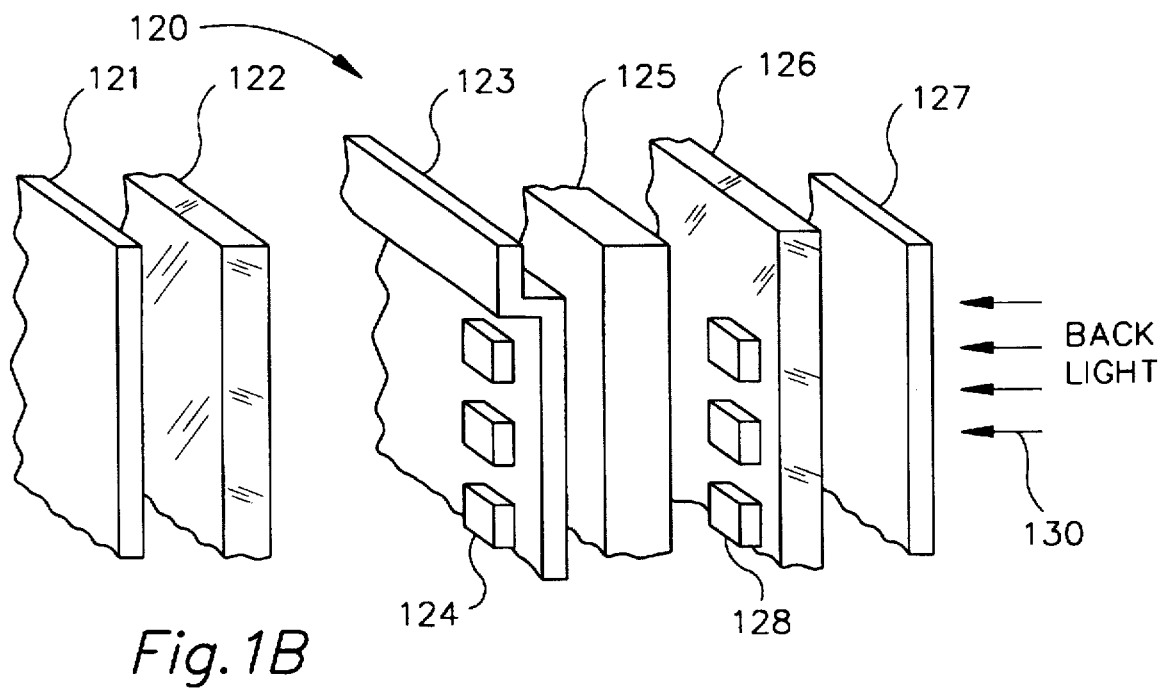

FIGS. 1A and 1B illustrate two commonplace embodiments of spatial additive color information displays. Referring first to FIG. 1A, the typical shadow mask cathode ray tube 100 such as is used in commercial colored television receivers and which is the predominant device for color information display, is shown. Full color is achieved with the shadow-mask color cathode ray tube by the spatial integration of luminous emissions from closely-spaced R,G and B phosphor dots 106, each of which is excited by an associated electron beam 102. The phosphor dots are positioned on the cathode ray tube face 104. Electron beams 102 are generated by a plurality of electron guns. The R,G and B phosphor dots 106 are arranged in pixel groups 105. The electron beams 102 exciting each phosphor dot of a pixel group 105 pass through an aperture associated with each pixel group 105 in the shadow mask 103. Note that the spatial integration of chromatic information is performed by the observers eye and not the display device, thus requiring the display device to possess sufficient resolution such that the individual primary color elements are not individually resolvable by the eye of the observer.

Referring next to FIG. 1B, another full-color display device, which relies on spatial-additive color synthesis is shown. This display is generally referred to as an active-matrix addressed liquid crystal color matrix display. While the basic principles of image formation and color mixture are the same as those used in the shadow mask color cathode ray tube, the liquid crystal color matrix display 120 employs a liquid crystal material which serves as an electronically controlled light valve at each picture element individually to gate incident light through a microlayer of color filters (typically R,G and B). Backlight 130 is transmitted through polarizing material 127. The backlight is then transmitted through the glass substrate 126 upon which our positioned thin film transistors 128. Liquid crystal material 125 is contained between g(transparent) electrode 123. As(transparent) electrode 123. Associated with each thin film resistor 128 is a filter 124. The thin film transistor 128 controls the intensity of light transmitted through the associated filter 124. Three filters (R,G and B) 128 form an image pixel. The filtered light is then transmitted through glass substrate 122 and polarizing unit 121.

Figure 2:
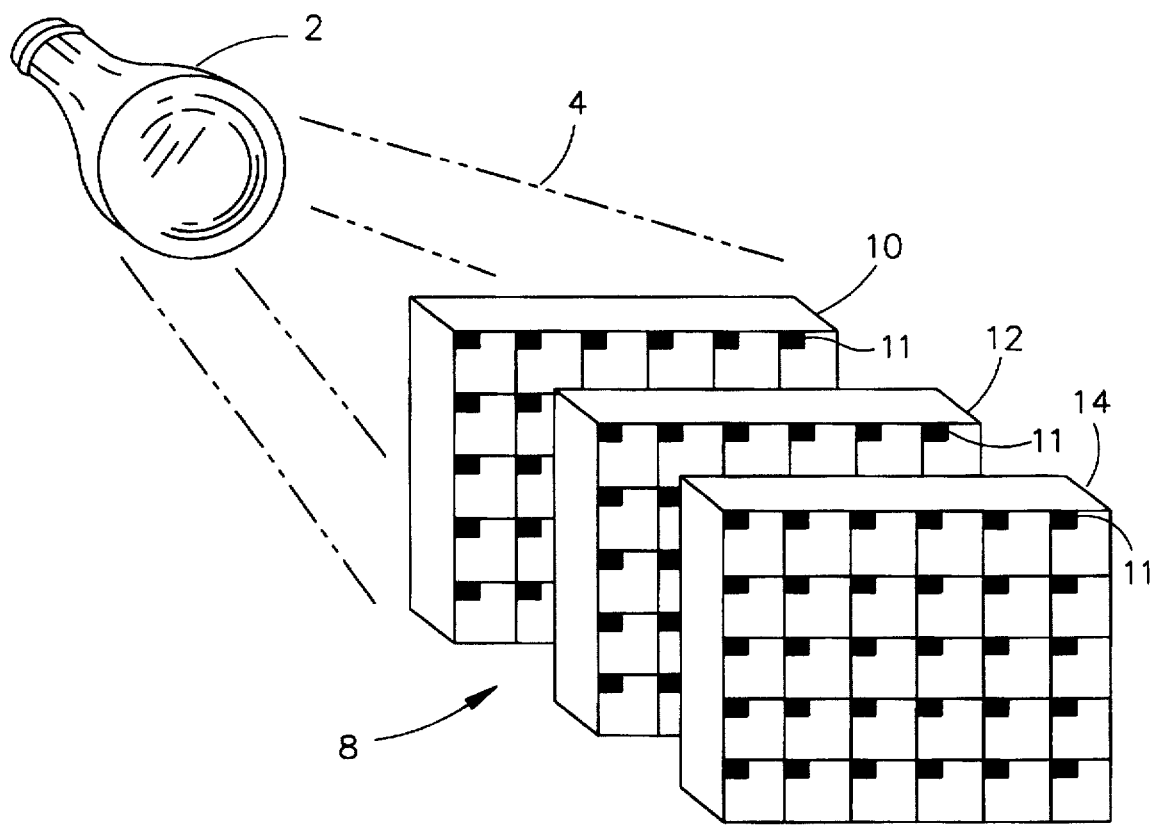
FIG. 2 is a conceptual exploded view of a subtractive color liquid crystal display.

FIG. 2 shows conceptually the structure for a subtractive color liquid crystal display. Light source 2 emits light which is incident upon the RGB subtractive stack 8. At the conceptual level, the stack 8 is made up of three separate color filters 10, 12 and 14. Each of the filters selectively removes a portion of the visible spectrum from the light emitted by light source 2. In the configuration shown, yellow filter 10 acts to remove blue light, cyan filter 12 acts to remove red light, while magenta filter 14 acts to remove green light. Within each of these filters are individual picture elements 11 which can be turned on and off depending on the output desired. By manipulating the individual picture elements within the filters 10, 12 and 14 a color image is generated.

Figure 3:
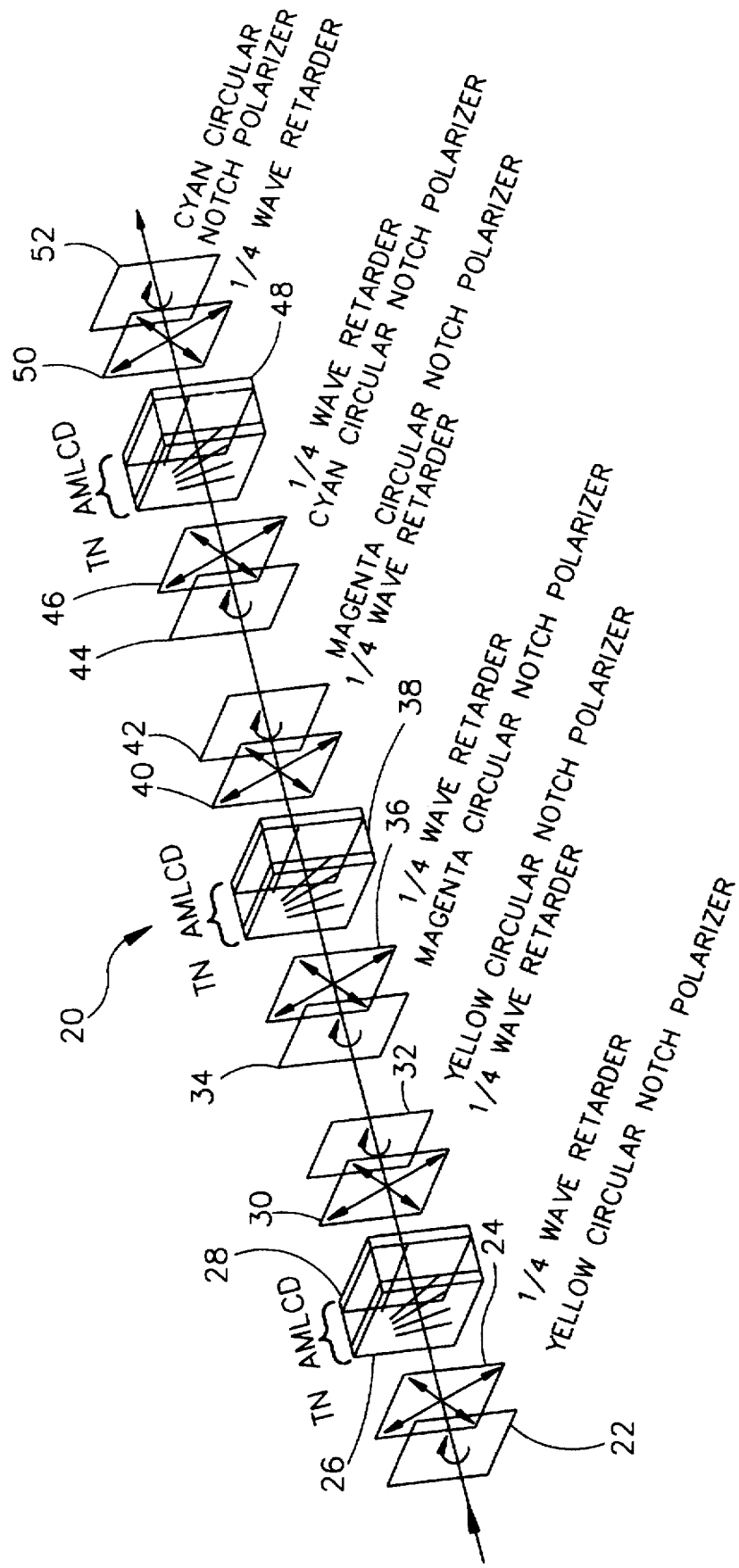
FIG. 3 is a 3-D exploded view of a picture element within the preferred subtractive color liquid crystal display with circular notch polarizers and retarder films.

The present invention incorporates subtractive color technology into a liquid crystal display. As is well known, each display is made up of many individual picture elements. A detailed view of a picture element for one embodiment of the display is shown in FIG. 3. The picture element 20 is comprised of a light source 21 and three active switching elements 28, 38, and 48 with color notch polarizers located on either side. The combination of these elements forms a stacked structure. Each active switching element is comprised of two transparent electrodes with liquid crystal contained between. The liquid crystal used in the preferred embodiment of the invention is of the twisted nematic (TN) although super twisted nematic (STN) liquid crystal may also be used. The liquid crystal twists the polarity of incident light upon the element when no voltage is applied across the electrodes. When a voltage is present, the incident light is allowed to pass unchanged in its polarity. Adjacent to switching element 28 is yellow circular polarizer 22 with ¼ wave retarder plate 24. The combination of yellow circular polarizer 22 and ¼ wave retarder plate 24 act as a linear polarizer for blue light. The quarter wave retarder plate 30 converts the linearly polarized blue light back to circularly polarized light, where the direction of polarization is right handed or left handed depending on the entrance direction of the linearly polarized blue light exiting the twisted nematic liquid crystal (on or off) and entering the retarder plate 30. The circularly polarized blue light exiting the opposite side retarder is either transmitted (passed) or reflected (extinguished) depending on whether the handedness is the same or opposite that of retarder plate 30. The combination of the polarizers, ¼ wave retarder plates, and switching element act as a selective filter for blue light.

Between polarizer 32 and switching element 38 is magenta circular polarizer 34 and ¼ wave retarder plate 36. This combination acts as a linear polarizer for green light. On the opposite side of switching element 38 is ¼ wave retarder plate 40 and magenta circular polarizer 42. The combination of ¼ wave retarder plates 36 and 40 and magenta circular polarizers 34 and 42 act as a selective filter, depending on the state of switching element 38, to either extinguish or pass green light. Between polarizer 42 and switching element 48 are cyan circular polarizer 44 and ¼ wave retarder plate 46. This combination acts as a linear polarizer for red light. Opposite the switching element are ¼ wave retarder plate 50 and cyan circular polarizer 52. The combination of ¼ wave retarder plates 46 and 50 and polarizers 44 and 52 act as a selective filter, depending on the state of switching element 48, to either pass or extinguish red light. The filters can be in any sequence, and the order shown in FIG. 3 is by no means a limitation.

Figure 4:
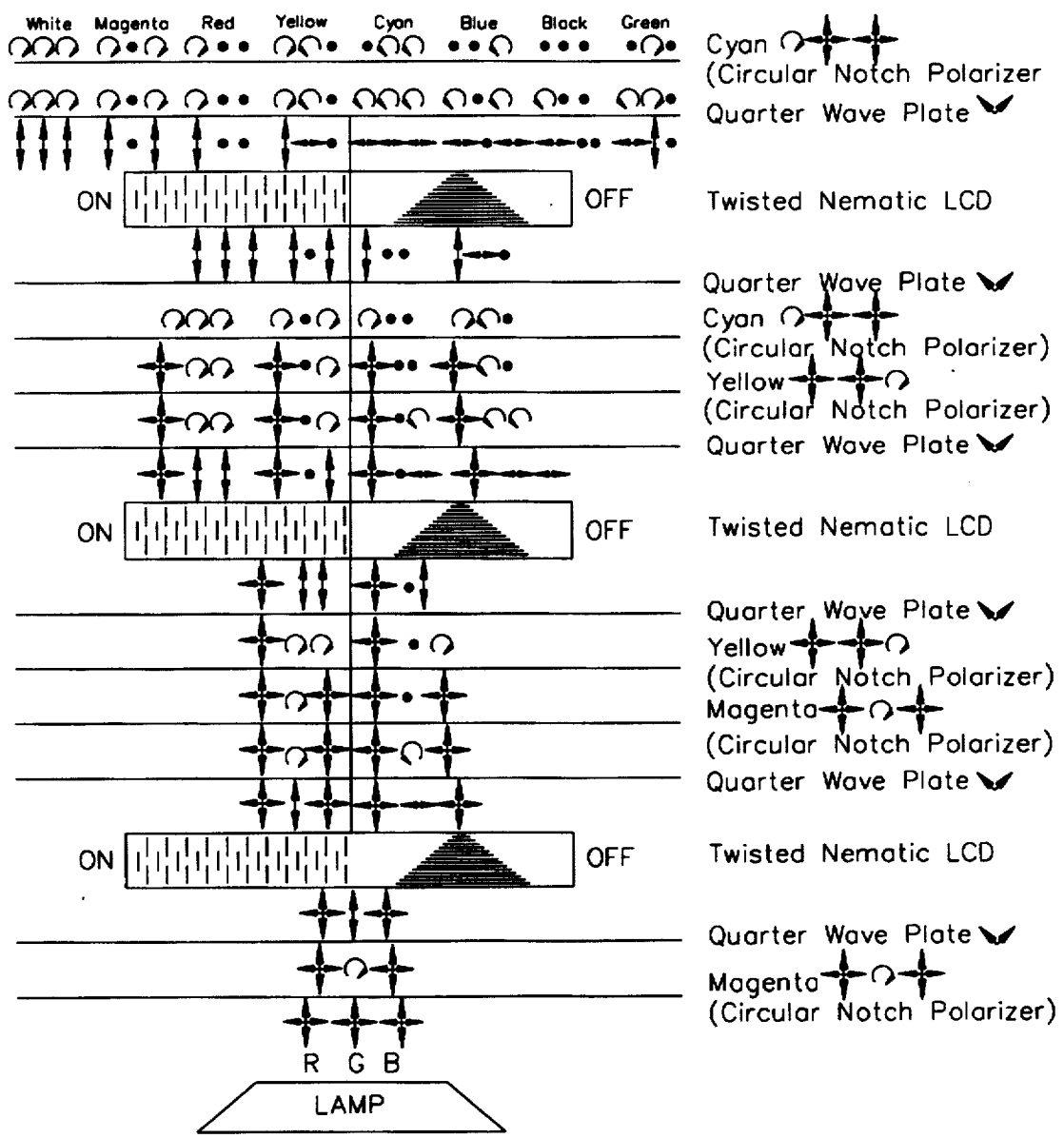
FIG. 4 is a truth table for a picture element within the twisted nematic subtractive color liquid crystal display utilizing circular notch polarizers and retarder films.

An understanding of the operation of an individual picture element in the subtractive color liquid crystal display can be gained by study of the truth table shown in FIG. 4. The truth table tracks the polarization and modulation of light through the subtractive color display assembly. Unpolarized white (RGB) light is the entrance light medium. Crossed arrows indicates non-polarized light. Linear polarized light is indicated by a direction arrow for X and Y polarized light. A black dot indicates extinction of color. The order of color in each group of three symbols is R,G,B. The cyan magenta and yellow circular polarizers circular polarize red, green and blue respectively. These polarizers pass right handed circular polarized light and block (reflect) left handed circular polarized light. Quarter wave retarders convert circular polarized colors to linear polarized prior to entering each twisted nematic liquid crystal cell. The liquid crystal cell rotates the linear polarization 90 degrees in the offstate, and does not rotate in the field on state. The output quarter wave retarders are aligned such that Y linear polarized colors become circular polarized right handed, and X linear polarized colors become circular polarized left handed. The right handed circular polarized colors R,G, and B are transmitted by the output circular notch polarizers C, M, and Y respectively, and the left handed circular polarized colors R,G and B are extinguished (reflected) by the output circular notch polarizers C, M and Y respectively. Each subtractive color modulation element in this subtractive color series is of the order: right handed circular polarizer, quarter wave retarder, twisted nematic light valve, quarter wave retarder, right handed circular polarizer. A left handed circular notch polarizer series, as well as a series combination of left and right handed circular notch polarizer can also be constructed with equal success. All of the above series can be oriented for normally colored or normally white as desired.

Initially, the light which is incident upon the picture element is white containing elements of all three primary colors. As the light travels through the picture element, the different primary colors are either subtracted or allowed to pass depending on the desired color to be transmitted to the viewer. In this embodiment of the invention, the polarizer order is such that the magenta polarizers are first, the yellow polarizers are second, and the cyan polarizers are third. As was described above, the magenta polarizers polarize green light, the yellow polarizers polarize blue light, and the cyan polarizers polarize red light. According to the truth table, when white light strikes the magenta circular polarizer, the green component of the light is circularly polarized while the other components of the light passed unchanged. At the ¼ wave plate, the circularly polarized green light is linearly polarized in one direction. If a charge is across the liquid crystal cell, the polarization of the light passing through will be unchanged, while if the liquid crystal cell is off, the polarization of the light is rotated 90°. The ¼ wave plate on the opposite side of the liquid crystal cell will circularly polarize in the counter clockwise direction the green light polarized in a first direction, and circularly polarize in the clockwise direction green light polarized in a second direction. At the second magenta circular polarizer the green light which is circularly polarized in the counter clockwise direction is blocked while the green light which is polarized in the clock wise direction is allowed to pass. The yellow and cyan notch polarizers perform the same function on the red and blue light, respectively. These components of the incident light are either filtered completely or allowed to pass. As is seen at the top of the truth table, all eight basic combinations of light (primary, subtractive, white, and black) are allowed to exit the picture element. However, this does not take into account various shading techniques and gray scale which can be created by partially turning on and off those liquid crystal cells. The truth table merely shows the basic operation of a particular picture element in the subtractive liquid crystal display to yield full color.

The combination of the circular notch polarizers and the ¼ wave retarder plates create a linear polarizer for the incident light. In the preferred embodiment of the invention, cholesteric liquid crystal silicones are used in the construction of the circular notch polarizers. Polarizers fabricated from cholesteric liquid crystal silicones are almost ideal polarizers for TN LCD subtractive color displays. These polarizers are commonly called notch polarizers because of the very steep and isolated polarization bands, which polarize a specific wavelength region of the visible spectrum. Contrary to conventional polarizing filters employing dye or iodine, cholesteric filters do not absorb light, but instead reflect the polarized light and allows the rest to pass.

Liquid crystal silicones are side chain polymers with a siloxane ring as a backbone and mesogenic side groups to induce a liquid crystalline phase. Pitch, helicity, and reflection color are determined by type and ratio of mesogenic side groups. The liquid crystal silicones are available from the Wacker Corporation of Germany. The cholesteric liquid crystal silicone (CLCS) mixtures are formulated to adjust the chirality (cholesteric twist) for characteristic polarization notch wavelength locations. Using suitable materials, the CLCS can be crosslinked thermally or by UV-irradiation.

The CLCS linear polarizers are tuned to a particular wavelength and then bonded to a ¼ wave film tailored for specific ¼ wave retardation for each color (red, green, and blue wavelengths). Stretch polymer films are selected for the ¼ wave length retardation of optimized red, green, and blue CLCS circular notched polarization reflecting films, which are optimally tuned to the particular lamp spectra output. This will maximize the linear conversation of circular polarized light, for high linear polarization efficiency and higher transmission with respect to the linear polarization conversion. Achromatic (wide band) retarders can also be used. The ¼ wave retarders serve to convert circular polarized light to linear polarized light, and linear polarized light to circular polarized light. The CLCS layer thickness is calibrated for optimization of notched polarization band-width, to maximize out of band transmission, minimize minor overlap of the cyan notch with the magenta notch, and the magenta notch with the yellow notch, for the illumination used (wide or narrow band).

The advantage of the notch polarizers described herein is that instead of filtering large portions of the incident light these filters sharply remove an isolated color band. Films made of cholesteric liquid crystal silicones efficiently reflect a isolated band of circularly polarized light (50%) as a single-handedness of chirality, while transmitting approximately 50% of light as light efficiently circularly polarized in the opposite chiral-handedness in a narrow notch bandwidth. These notched polarizers transmit 80–100 percent unpolarized light outside the isolated polarization bandwidth, which is almost ideal polarizer behavior and much superior to that of dichroic polarizers which are commercially available. FIGS. 5 through 8 are a comparison of light transmission through picture elements which use either the notch circular polarizers described herein or commercial dichroic polarizers. The illumination source is a triband lamp.

Figure 6:
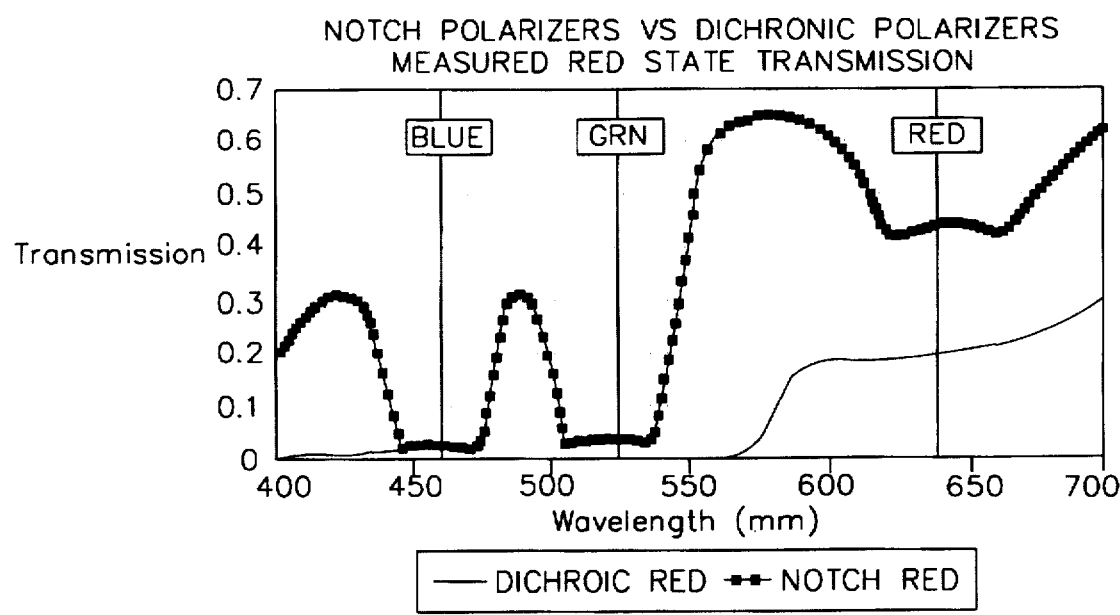
FIG. 6 is a comparative transmission diagram for red light of a picture element with either notch polarizers or dichroic polarizers.
Figure 5:
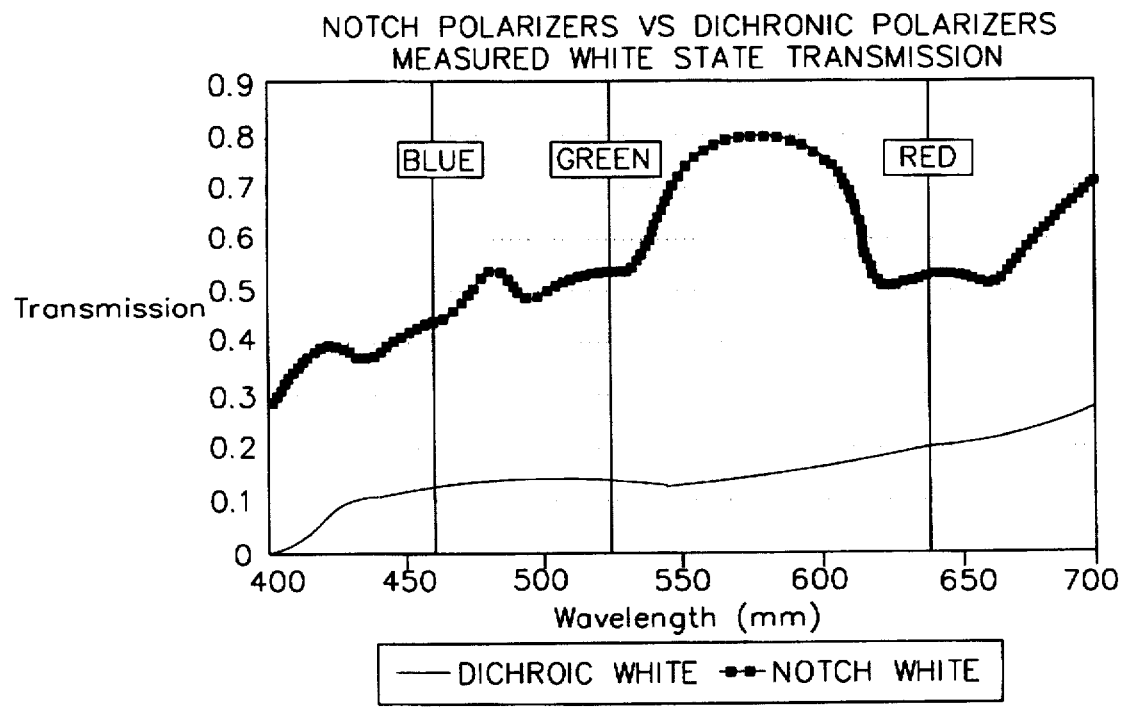
FIG. 5 is a comparative transmission diagram for white light of a picture element with either notch polarizers or dichroic polarizers used to obtain approximately equivalent color gamuts.
Figure 8:
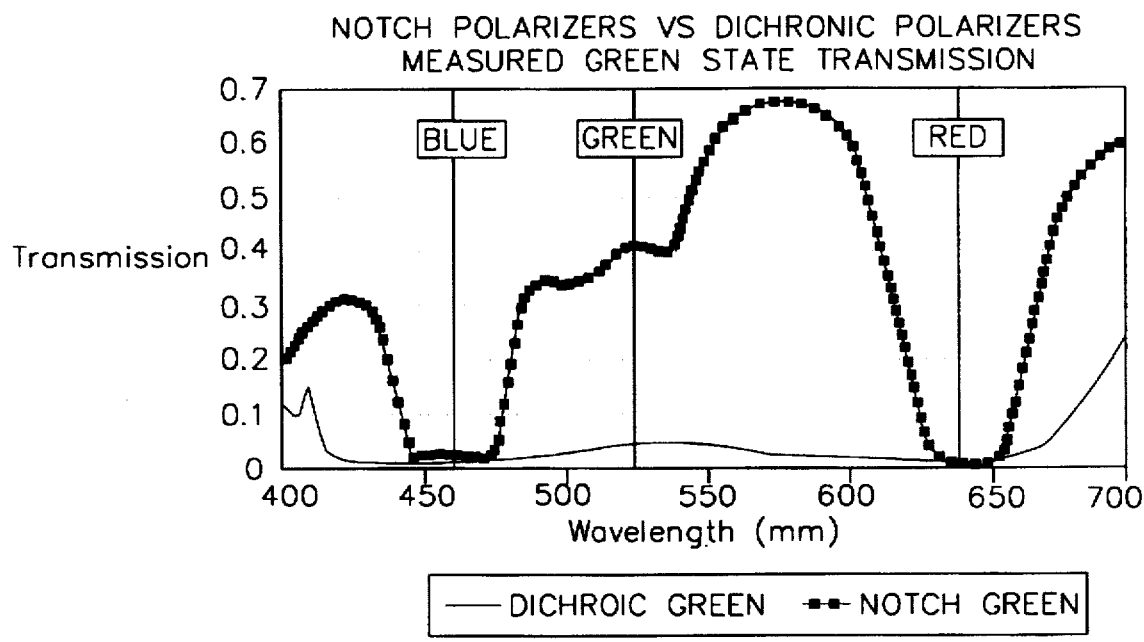
FIG. 8 transmission diagram for is a comparative transmission diagram for blue light of a picture element with either notch polarizers or dichroic polarizers.
Figure 7:
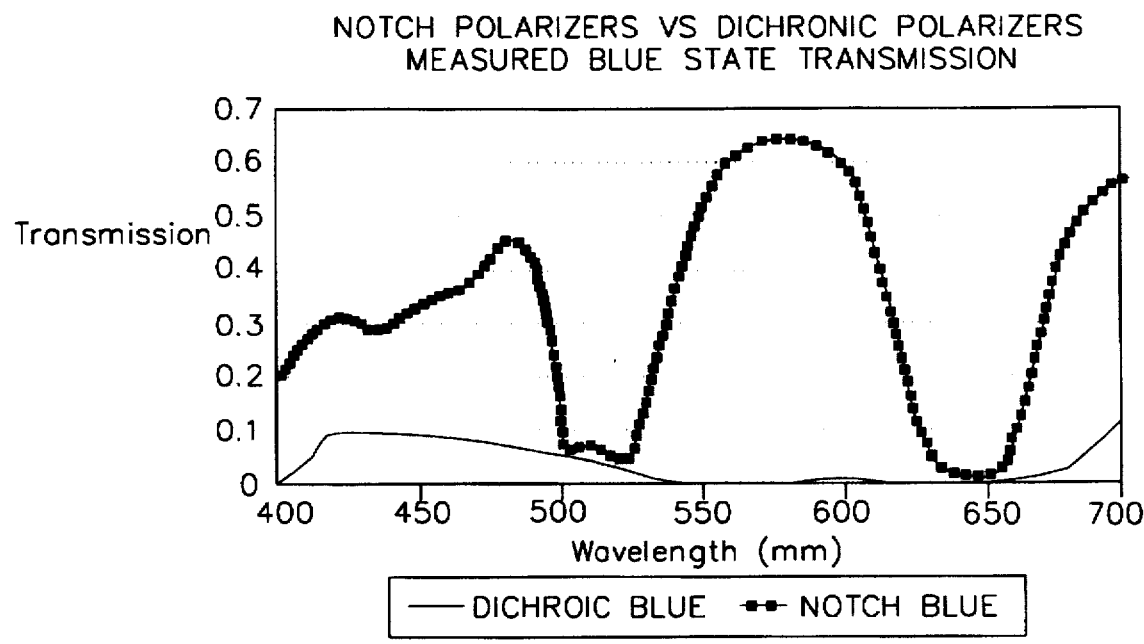
FIG. 7 transmission diagram for is a comparative transmission diagram for green light of a picture element with either notch polarizers or dichroic polarizers.

FIG. 5 shows the transmission of white light through the picture elements of both types. The dashed line is the notch polarizer white and the solid line is the dichroic white. As is seen by the graph, the transmission of white light through the circular notch polarizers is many times greater than the amount of white light transmitted through the dichroic filters for equivalent color gamut. FIG. 6 shows the situation where red light is emitted from the picture element. With the notch filters, the blue and green components of the incident light are nearly completely removed, however the transmission of the red light is over twice what it would be with the dichroic filters. This graph also clearly shows the narrow and steep bands of light which are filtered by the circular notched polarizers. Spectra between the blue and green, and the green and red, is allowed to pass through the picture element. FIGS. 7 and 8 show the performance of the picture element for blue and green light respectively. Once again the narrow and steep bands of filtered light are apparent.

Figure 9:
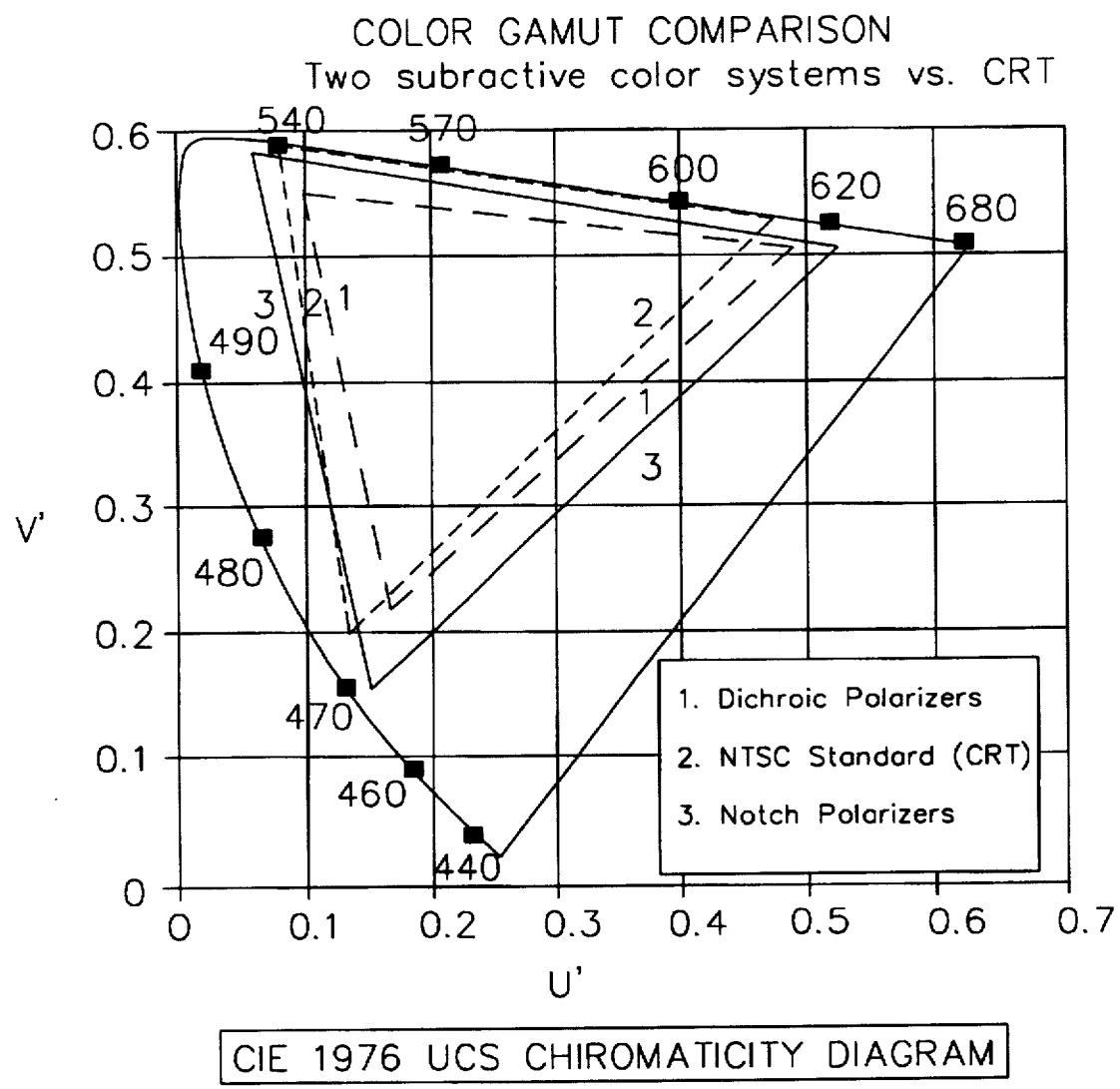
FIG. 9 is a chromaticity diagram comparing the NTSC standard with dichroic polarizer and notch polarizer subtractive color systems.

These results indicate phenomenal improvements in optical transmission compared with optimized color dichroic filter technology in a subtractive color light valve, while also indicating an improved color gamut (i.e., no sacrifice in color gamut, but rather an improvement). The estimated color gamut for the notch polarizer is compared with the color gamut for dichroic polarizers and with the NTSC standard in the chromaticity diagram shown in FIG. 9. The chromaticity diagram displays three color gamuts. The first is a twisted nematic subtractive color display for perfected color gamut with dichroic dye color sheet polarizers and other dichroic dye type polarizers. The second is the NTSC Standard characteristic of a CRT. The third is a twisted nematic subtractive color display utilizing circular notch polarizers, quarter wave retarders, and a tuned light source. The color gamuts are shown in CIE 1976 chromaticity coordinates. The notch polarizer color gamut is the largest with more available color hues.

Figure 10:
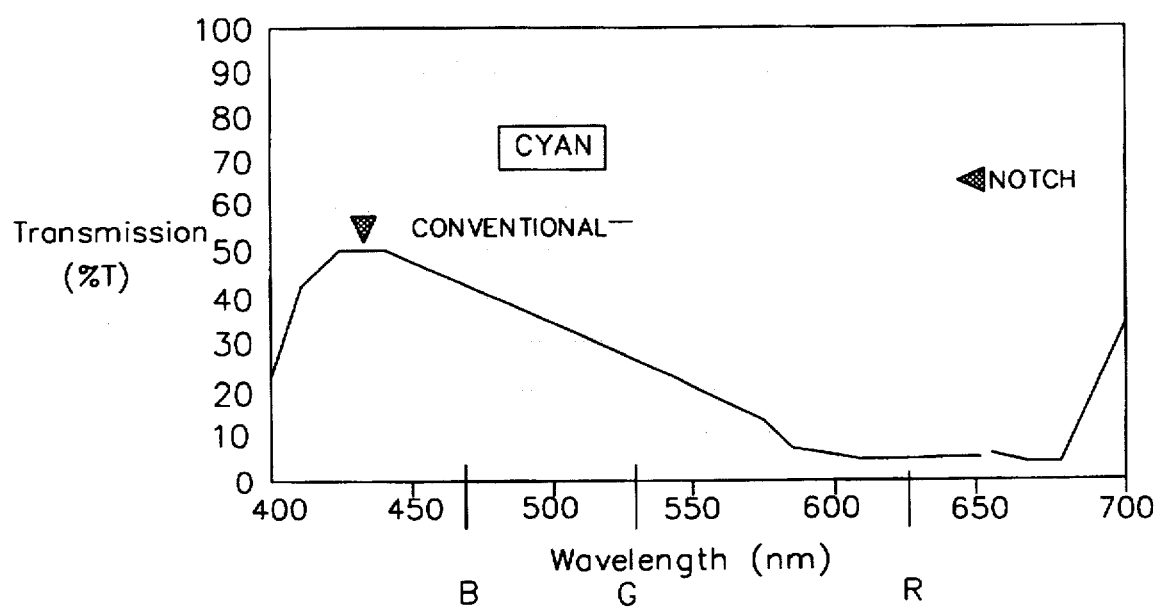
FIG. 10 is a transmission diagram comparing the performance of a dichroic red filter and a notch red filter.

Another advantage of the color circular polarization notch filters is the reduction in overlap between the adjacent color filters. FIG. 10 is a transmission diagram showing the filtering of the color red with a notch filter versus a conventional dichroic filter. As is seen, the circular notch polarizer filters red light only in a narrow band with very little overlap into other regions of the visible spectrum. With the conventional dichroic filters, the red light is filtered, but there is significant filtering of green light. This has a detrimental affect on the brightness and contrast of the color display.

In order to utilize the advantages of the color circular notch polarizers in a subtractive color display, there must be some sort of optical tuning between the light source and the polarization bandwidth for each of the notch polarizers. The polarization bandwidth must be broad enough to filter any light emitted by the light source. In alternate embodiments of the invention the advantages of circular color notch polarizers can be used with a light source that is tuned to emit light in narrow bands of the three primary colors, is filter tuned to emit light over broader bands of the three primary colors, or emits light over a broad-band.

Figure 11:
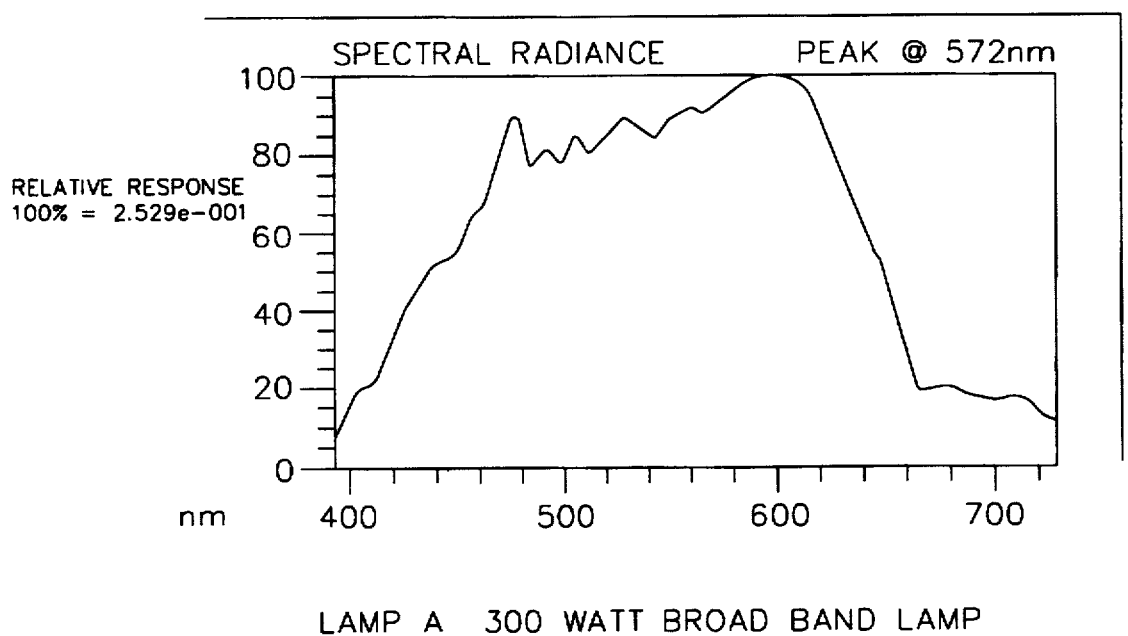
FIG. 11 shows the output spectrum of a broad band lamp.
Figure 12:
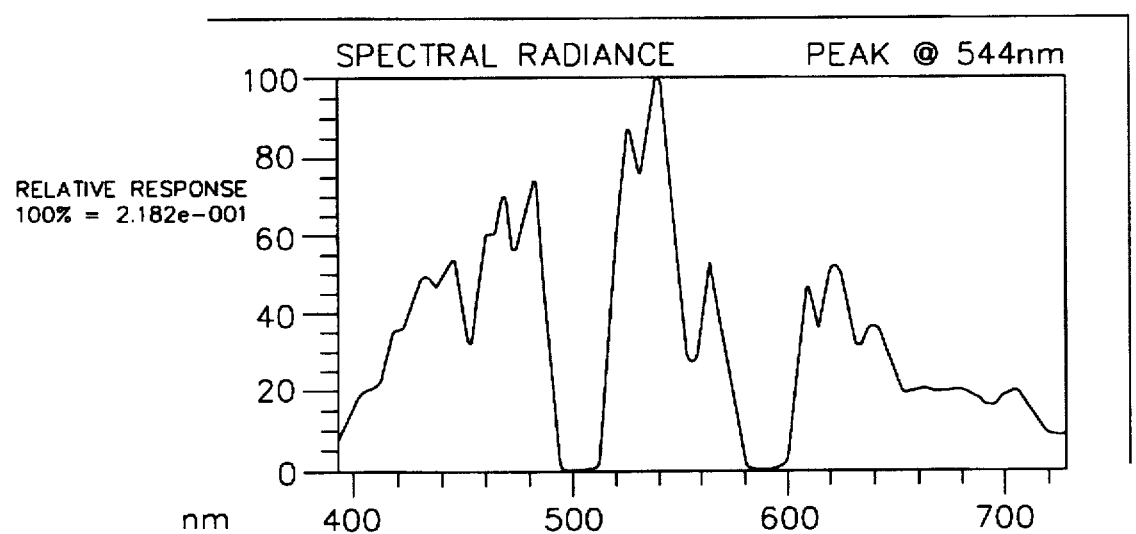
FIG. 12 shows the output spectrum of a filter tuned broad band lamp.

FIG. 11 is a graph of the output of a typical broad-band lamp. With this light source, light across the visible spectrum is emitted. In order to improve performance of the subtractive color display, it is advantageous to emit light whose components are more like those shown in FIG. 12. This particular graph is of a 300-watt broad-band lamp tuned to red, green, and blue peaks with notch filters. These notch filters can be incorporated as part of the lamp. The notch filters can be made of liquid crystal silicones as described above, or commercially available multidielectric interference filters, or other dichroic materials. These notch filters are used to tune broad-band light sources such as a xenon arc lamp, a metal halide lamp, a tungsten halogen lamp, or a fluorescent lamp. Another is a triband light source such as individual lasers which emit primary colors in narrow wave bands.

Figure 13:
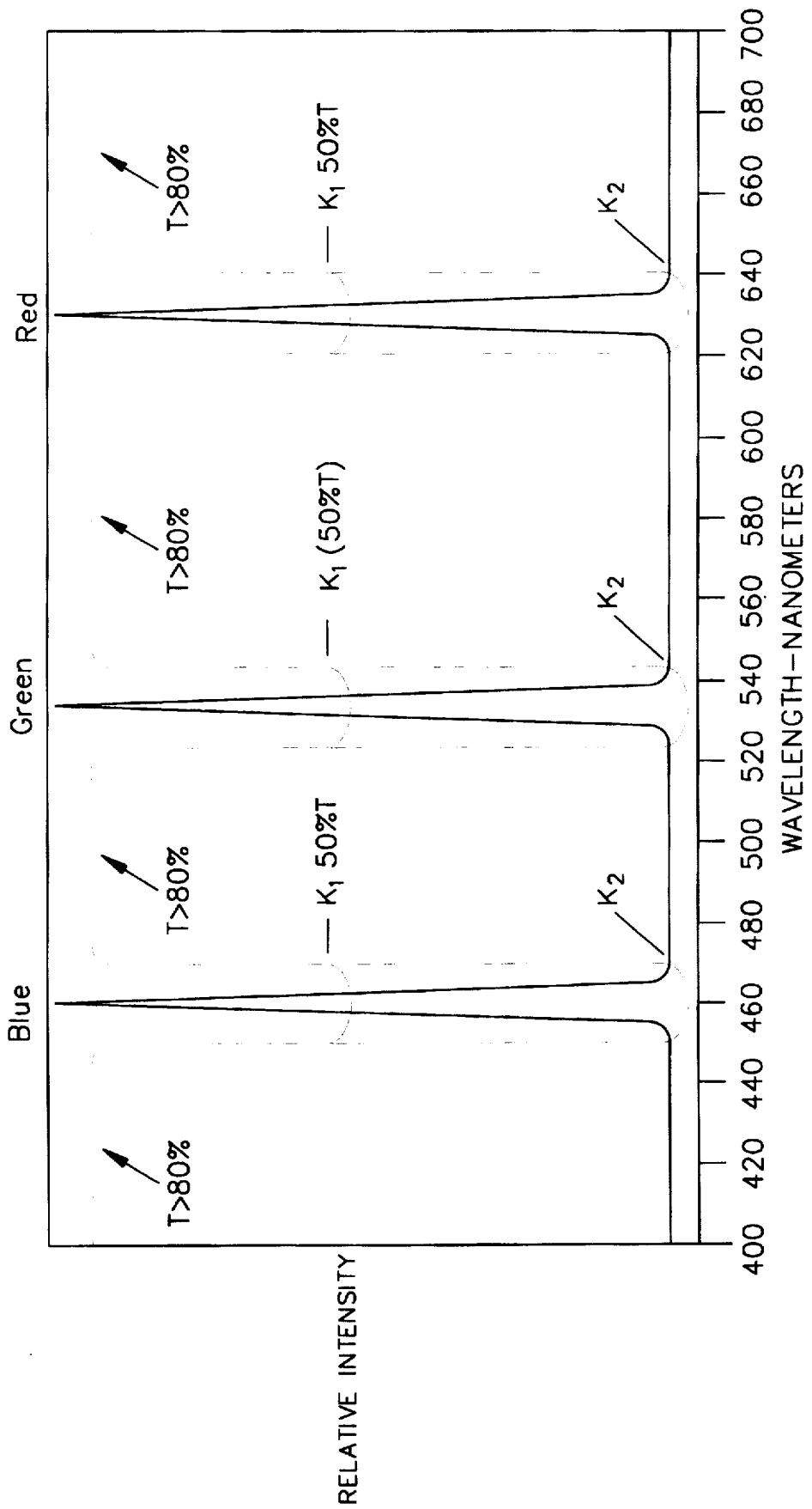
FIG. 13 shows the output spectrum of a triband light source.

In a first embodiment of the invention, a triband light source such as three individual lasers, or a tuned broad band lamp can be used. With most types of light sources, the embodiment of the picture element shown in FIG. 3 can be used. The output of a triband light source is shown in FIG. 13a. The output consists of three narrow spikes of the primary colors whose magnitude and width are known. Since the triband light source does not emit any light between the primary color peaks, a single layer of the liquid crystal silicones is tuned to provide the necessary selective filtering. FIG. 13a shows in particular the notch polarizer positioning and color control for a tri-band lamp with narrow isolated peaks when collimated light is used for illumination, and no direct view or viewing cone of illumination is desired.

Figure 14A:
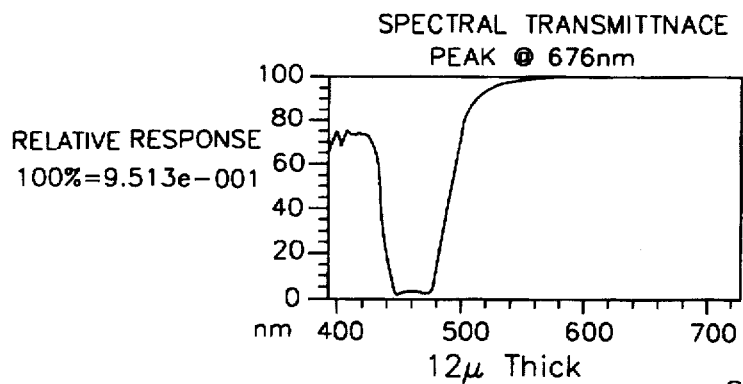
FIGS. 14a–d are transmission diagrams showing the performance of a single layer circular notch polarizer as its thickness is increased.
Figure 14B:
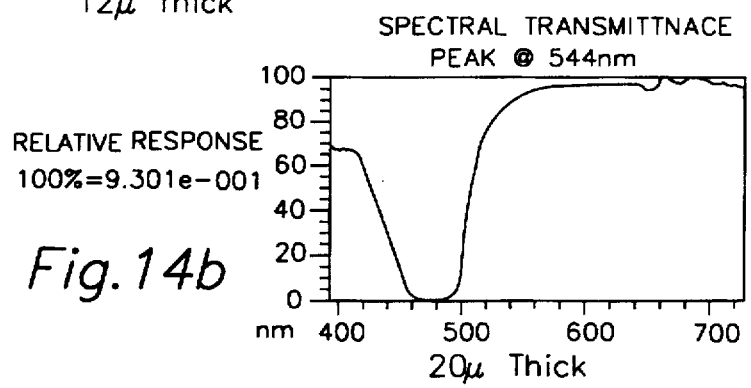
Figure 14C:
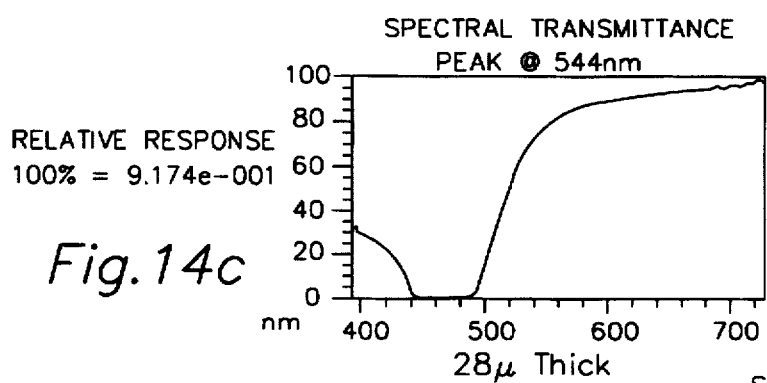
Figure 14D:
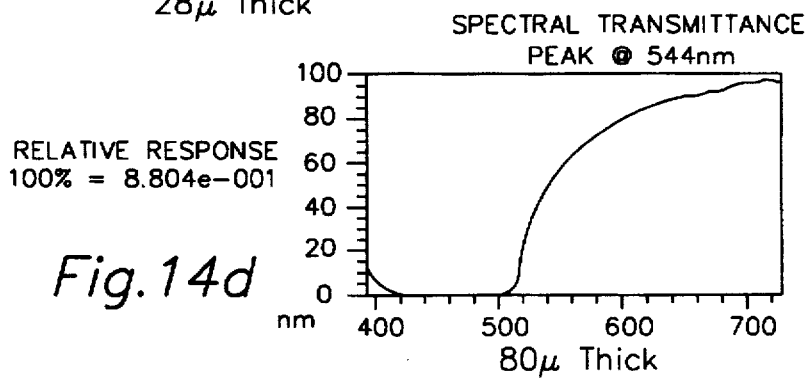

In the situation where a notch filter tuned broad-band lamp is employed as the light source it is necessary to expand the range in which the circular notch polarizers function. In order to facilitate this expanded range a thicker circular polarizers can be employed. Wider bands of incoming light can be filtered by increasing the thickness of the liquid crystal silicone layer. The effect on the filtering of light in the blue range through thickness increases can be seen in graphs shown in FIGS. 14a–d. In FIG. 14a the silicone layer is 12µ thick and the notch is narrow. In FIGS. 14b–c the silicone layer thickness is increased to 20µ, to 28µ, and finally to 80µ, and the width of the notch correspondingly increases. Both notch polarizer bandwidth and notch polarizer efficiency are increased with increasing notch polarizer layer thickness.

Figure 15:
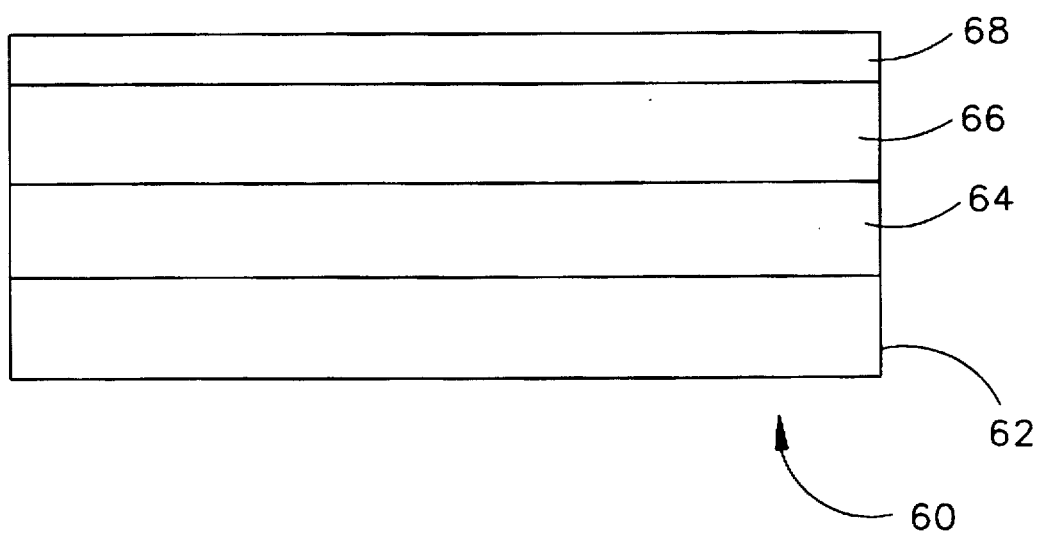
FIG. 15 shows the construction of a multiple layer notch polarizer.

In another embodiment of the invention, multiple layers of the liquid crystal silicones are tuned per ¼ wave retarder plate in order to increase the polarizer bandwidth. The configuration using multiple polarizing layers is shown in FIG. 15. The notch filter is now comprised of a ¼ wave retarder plate 68 with three layers of the liquid crystal silicones 62, 64, and 66. The performance of this embodiment of the invention is shown in FIGS. 16a and b.

Figure 16A:
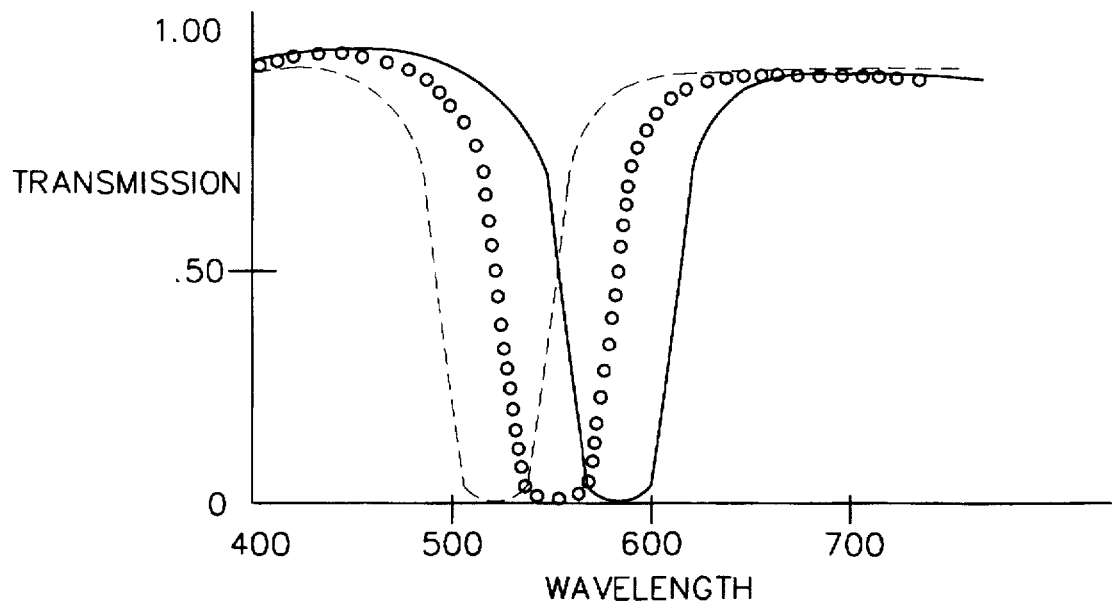
FIGS. 16a and b are transmission diagrams showing the performance of multiple layer notch polarizers.
Figure 16B:
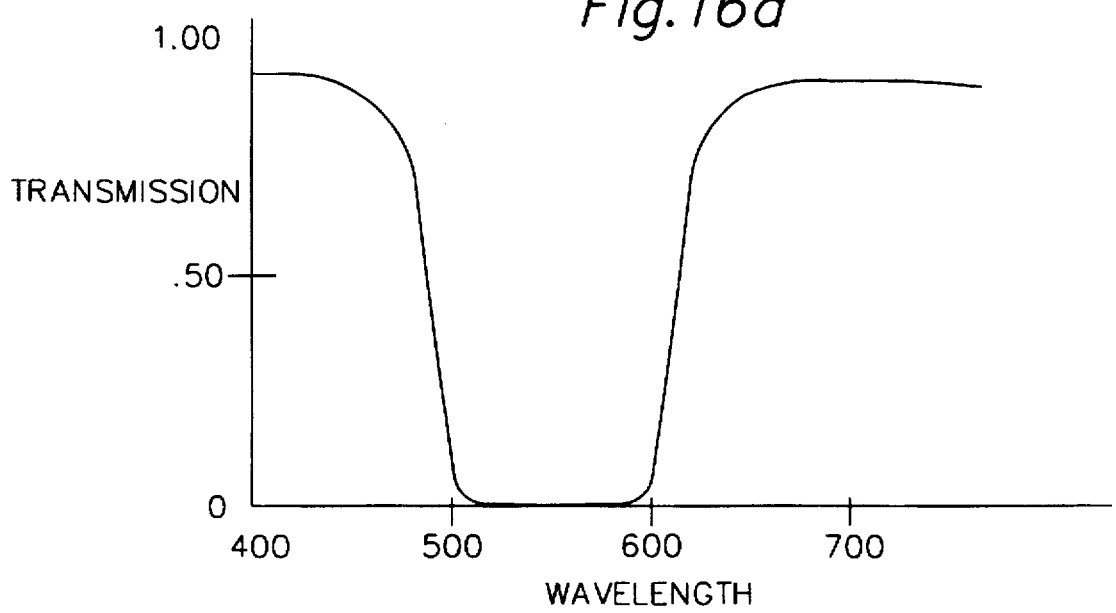

FIG. 16a shows in particular, portions of the incident light filtered by each of the liquid crystal silicone layers. For example, layer 62 may be optimized to polarize light in the band from 500 to 540 nanometers, while layer 64 may be tuned from 540 to 580 nanometers, and finally, layer 68 may be tuned to filter in the region of 560 to 600 nanometers. The overlap between the polarizers is not a problem and the layers are optimized to match the output of a particular light source. The composite for all layers is shown in FIG. 16b. Many of these liquid silicone layers can be used in order to provide the desired amount of filtering.

Figure 17A:
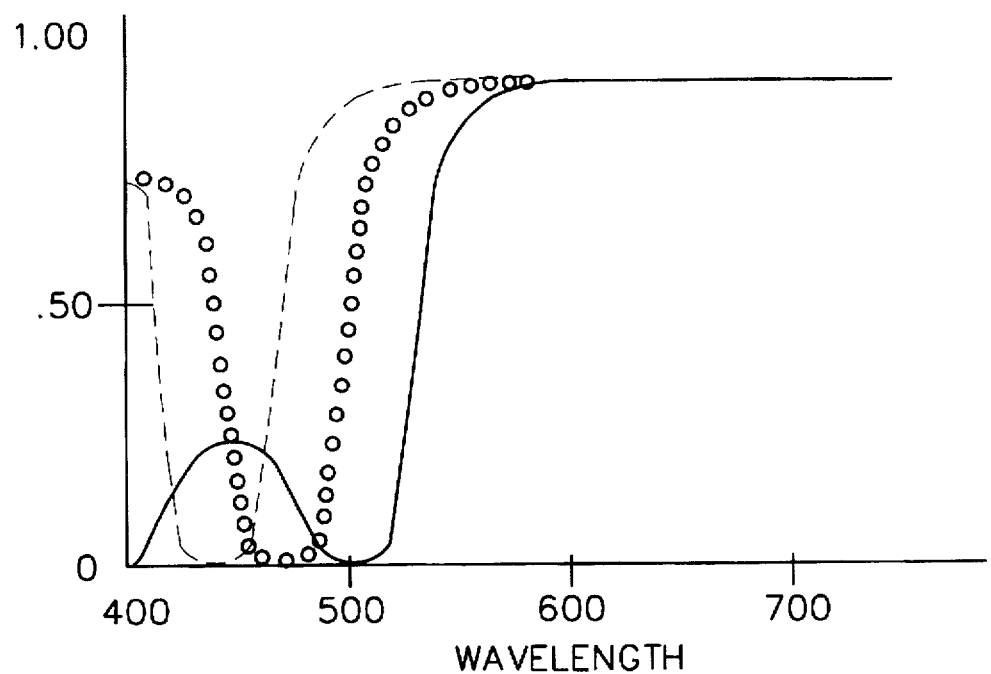
FIGS. 17a and 17b are transmission diagrams showing the performance of a combination of dichroic and notch polarizers.
Figure 17B:
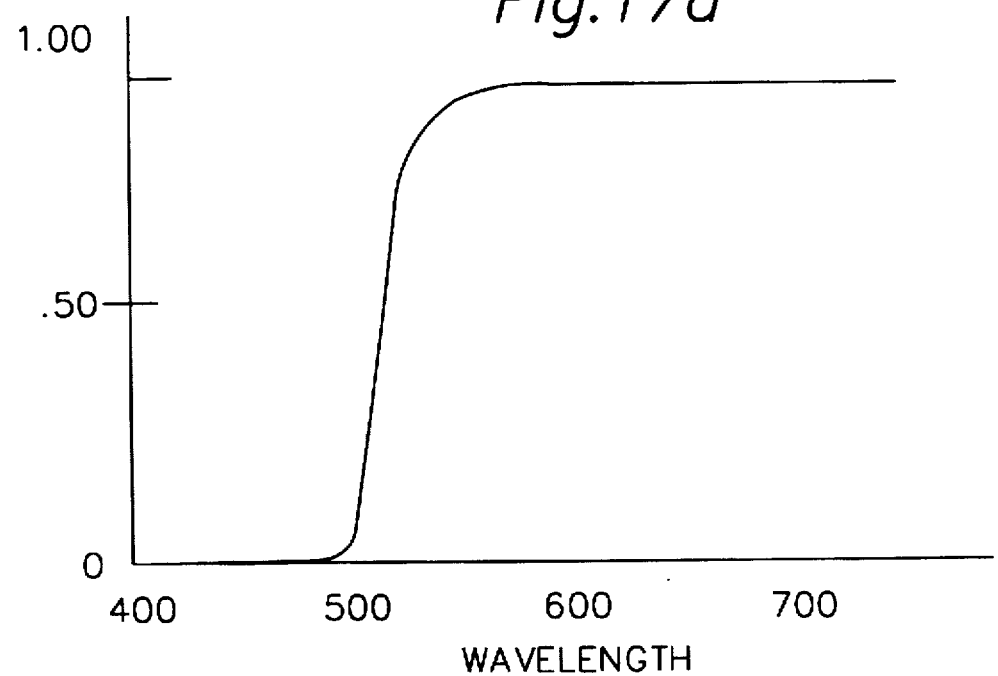

In a final embodiment of the invention, the circular notch polarizers are employed in conjunction with dichroic filters. In cases where broadband light sources are employed it is necessary to use dichroic filter in order to filter light over a wide spectral range. In the transmission diagram shown in FIG. 17a, the solid line shows the output of a typical dichroic filter for light between 400 and 500 nanometers. With a typical dichroic filter there can be significant leakage of light in the particular portion of the spectrum which is to be filtered. In FIG. 17a significant leakage is shown in the 450 nanometer range. In this embodiment, circular notch polarizers are used in conjunction with the dichroic filters to correct any leakage. The dash line and the circular dash line are the portions of the spectrum between 400 and 500 nanometers removed by the circular notch polarizers. As seen in FIG. 17b, when the circular notch polarizers are used in conjunction with the dichroic filters, any leakage from the dichroic filter can be eliminated without reducing the overall transmission quality of the dichroic filter.

Figure 18A:
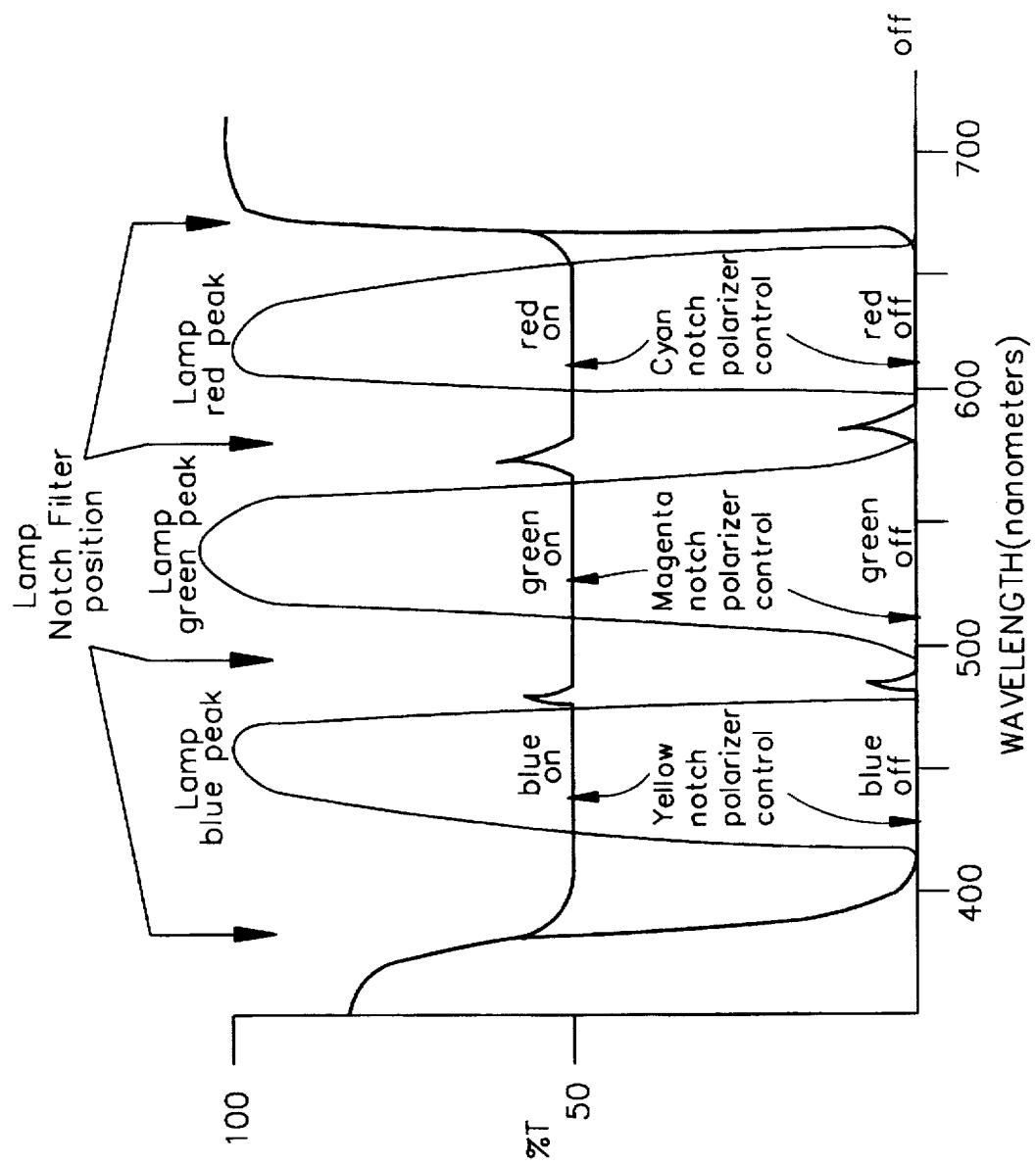
FIG. 18a is a graph of the notch filters tuned to primary color peaks for straight on viewing and FIG. 18b is a graph showing the width of the notches for angular viewing.

When using broad notch polarizers with a tuned broad band lamp, it is necessary to tune the filters to take into account both straight on viewing as well as angular viewing. In practice RGB lamp peaks are tuned and notch polarizer position and width is set such that polarizer notch location stays aligned with the color peaks, even when the notch shifts due to light passing through pixel at an angle other than normal to the cholesteric liquid crystal silicone layer. FIG. 18a shows the preferred tuning of the filters for straight on viewing.

Figure 18B:
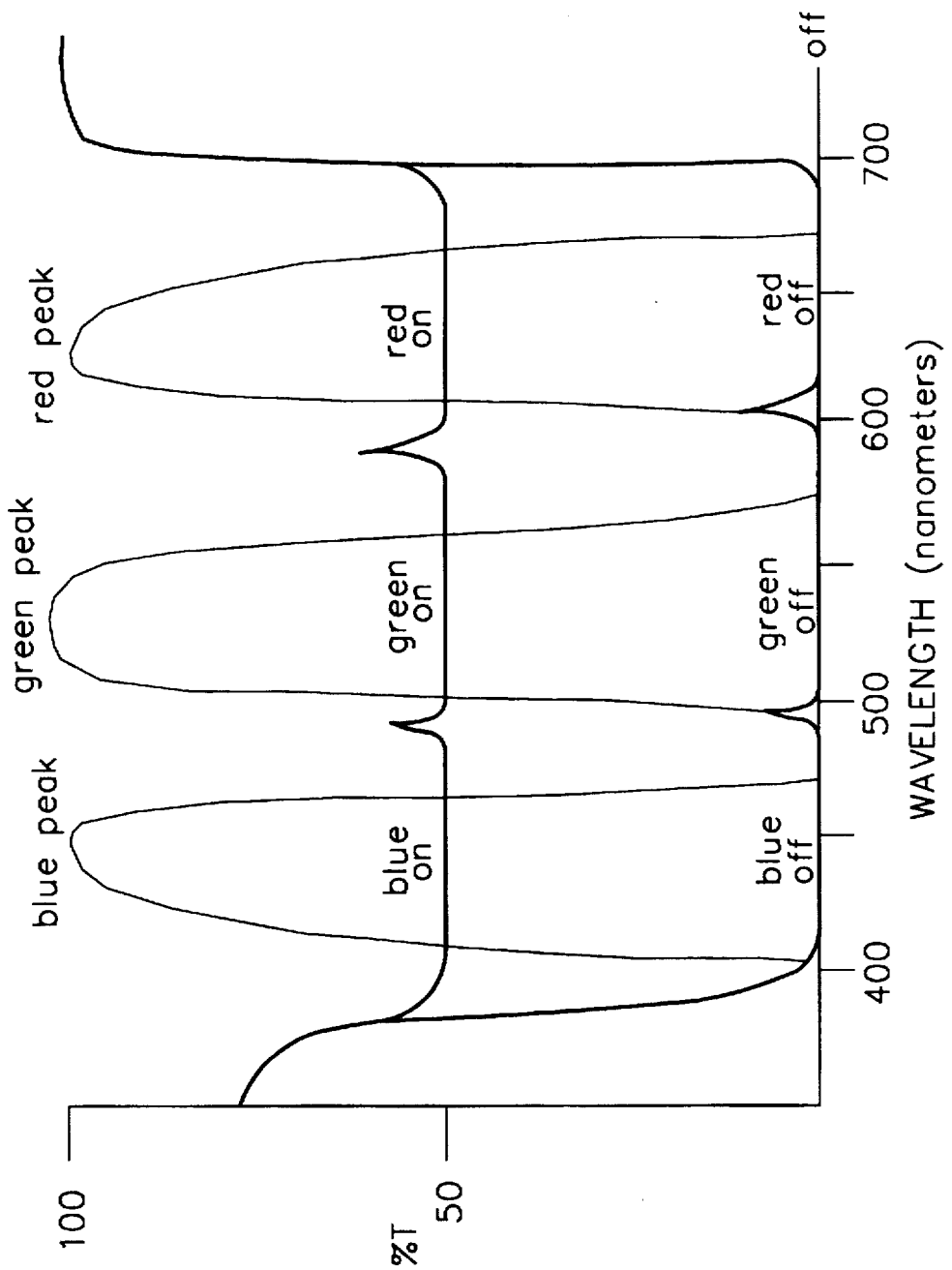

In order to prevent a chromaticity shift for angular light the notch position shown in FIG. 18a must be shifted (expanded). The notch width can be expanded by any of the methods described above. Shown in FIG. 18b is the shifted notch position for the same design as FIG. 18a but for light passing through at plus or minus 40 degrees from notch polarizer layer normal. The notch shifts to lower wavelengths but stays aligned with lamp peak, and does not attenuate adjacent peaks due to correct separation between peaks. This design prevents a chromaticity shift for angular light output. With narrower lamp peaks such as a tri-band lamp or laser, a similar design but with narrower notch polarizer bandwidths can be utilized.

The foregoing is a description of a novel and non-obvious subtractive color liquid crystal display utilizing the circular notch polarizers. The Applicant does intend to limit the invention through the foregoing description, but instead is defining a invention through the claims appended hereto.

I claim:

1. A subtractive color liquid crystal display comprising:
   tuned illumination means comprising a triband tuned light source; and
   a plurality of picture elements, each of said picture elements comprising:
   first, second, and third active switching elements aligned relative to said illumination means, which selectively rotate polarization of incident light from said illumination means;
   a first entrance notch polarizer adjacent to the first switching element which polarizes a narrow band of light of the first primary color (red, green, and blue);
   a first exit notch polarizer adjacent to the first switching element which blocks or passes light of the first primary color depending on the rotation imparted on the light by the first switching element;

a second entrance notch polarizer adjacent to the second switching element which polarizes a narrow band of light of a second primary color;

a second exit notch polarizer adjacent to the second switching element which blocks or passes light of the second primary color depending on the rotation imparted on the light by the second switching element;

a third entrance notch polarizer adjacent to the third switching element which polarizes a narrow band of light of the third primary color; and a third exit notch polarizer adjacent to the third switching element which blocks or passes light of the third primary color depending on the rotation imparted on the light by the third switching element;

and wherein the entrance and exit notch polarizers are comprised of a circular notch polarizer and a quarter wave retarder plate, said circular notch polarizer being constructed of tuned crosslinked cholesteric liquid crystal silicons.

2. The subtractive liquid crystal display of claim 1 wherein the triband light source is a trio of lasers each of which emits light of a narrow bandwidth and high intensity for each of the primary colors.

3. A subtractive color liquid crystal display comprising:
tuned illumination means comprising a filter tuned broadband light source; and a plurality of picture elements, each of said picture elements comprising:

first, second, and third active switching elements aligned relative to said illumination means, which selectively rotate polarization of incident light from said illumination means;

a first entrance notch polarizer adjacent to the first switching element which polarizes a narrow band of light of the first primary color (red, green, and blue);

a first exit notch polarizer adjacent to the first switching element which blocks or passes light of the first primary color depending on the rotation imparted on the light by the first switching element;

a second entrance notch polarizer adjacent to the second switching element which polarizes a narrow band of light of a second primary color;

a second exit notch polarizer adjacent to the second switching element which blocks or passes light of the second primary color depending on the rotation imparted on the light by the second switching element;

a third entrance notch polarizer adjacent to the third switching element which polarizes a narrow band of light of the third primary color; and a third exit notch polarizer adjacent to the third switching element which blocks or passes light of the third primary color depending on the rotation imparted on the light by the third switching element;

and wherein the entrance and exit notch polarizers are comprised of a circular notch polarizer and a quarter wave retarder plate, said circular notch polarizer being constructed of tuned crosslinked cholesteric liquid crystal silicons.

4. The subtractive liquid crystal display of claim 3 wherein the filter tuned illumination means is tuned by a plurality of the notch polarizers which filter predetermined portions of the spectrum between the primary colors.

5. A subtractive color liquid crystal display comprising:
tuned illumination means; and a plurality of picture elements, each of said picture elements comprising:

first, second, and third active switching elements aligned relative to said illumination means, which selectively rotate polarization of incident light from said illumination means;

a first entrance notch polarizer adjacent to the first switching element which polarizes a narrow band of light of the first primary color (red, green, and blue);

a first exit notch polarizer adjacent to the first switching element which blocks or passes light of the first primary color depending on the rotation imparted on the light by the first switching element;

a second entrance notch polarizer adjacent to the second switching element which polarizes a narrow band of light of a second primary color;

a second exit notch polarizer adjacent to the second switching element which blocks or passes light of the second primary color depending on the rotation imparted on the light by the second switching element;

a third entrance notch polarizer adjacent to the third switching element which polarizes a narrow band of light of the third primary color; and a third exit notch polarizer adjacent to the third switching element which blocks or passes light of the third primary color depending on the rotation imparted on the light by the third switching element;

and wherein:
the entrance and exit notch polarizers are comprised of a circular notch polarizer and a quarter wave retarder plate, said circular notch polarizer being constructed of tuned crosslinked cholesteric liquid crystal silicons; and the notch polarizers are further comprised of a combination of dichroic sheet color polarizers making a broad notch polarizer or black filter polarizer which would be employed with broad band lamps.

6. The subtractive liquid crystal display of claim 5 wherein the circular notch polarizer is tuned to efficiently polarize light inefficiently polarized or not polarized by the dichroic sheet color polarizers.

7. A subtractive color liquid crystal display comprising:
illumination means comprising a triband tuned light source; and a plurality of stacked liquid crystal color filters each subtracting a particular primary color (red, green, blue), each filter includes a plurality of picture elements which are comprised of:

at least one entrance circular notch polarizer tuned relative to said illumination means to polarize one of the primary colors;

a liquid crystal switching element to selectively rotate light from the illumination means through a known angle; and at least one exit circular notch polarizer tuned relative to said illumination means to either block or pass the same one of the primary colors depending on the rotation selectively imparted on the light by the liquid crystal switching element;

and wherein the entrance and exit notch polarizers are comprised of a circular notch polarizer and a quarter wave retarder plate, said circular notch polarizer being constructed of tuned crosslinked cholesteric liquid crystal silicons.

8. The subtractive liquid crystal display of claim 7 wherein the triband light source is a trio of lasers each of which emits light of a narrow bandwidth and high intensity for each of the primary colors.

9. A subtractive color liquid crystal display comprising:

illumination means comprising a filter tuned broadband light source with tuned lamp peaks; and a plurality of stacked liquid crystal color filters each subtracting a particular primary color (red, green, blue), each filter includes a plurality of picture elements which are comprised of:

at least one entrance circular notch polarizer tuned relative to said illumination means to polarize one of the primary colors;

a liquid crystal switching element to selectively rotate light from the illumination means through a known angle; and at least one exit circular notch polarizer tuned relative to said illumination means to either block or pass the same one of the primary colors depending on the rotation selectively imparted on the light by the liquid crystal switching element;

and wherein the entrance and exit notch polarizers are comprised of a circular notch polarizer and a quarter wave retarder plate, said circular notch polarizer being constructed of tuned crosslinked cholesteric liquid crystal silicons.

10. The subtractive liquid crystal display of claim 9 wherein the filter tuned illumination means is tuned by a plurality of cross linked notch polarizer pairs which filter predetermined portions of the spectrum to define the bandwidth and location of the primary colors.

11. A subtractive color liquid crystal display comprising:
illumination means; and a plurality of stacked liquid crystal color filters each subtracting a particular primary color (red, green, blue), each filter includes a plurality of picture elements which are comprised of:

at least one entrance circular notch polarizer tuned relative to said illumination means to polarize one of the primary colors;

a liquid crystal switching element to selectively rotate light from the illumination means through a known angle; and at least one exit circular notch polarizer tuned relative to said illumination means to either block or pass the same one of the primary colors depending on the rotation selectively imparted on the light by the liquid crystal switching element;

and wherein:

and wherein the entrance and exit notch polarizers are comprised of a circular notch polarizer and a quarter wave retarder plate, said circular notch polarizer being constructed of tuned crosslinked cholesteric liquid crystal silicons; and the notch polarizers are further comprised of dichroic sheet color polarizers.

12. The subtractive liquid crystal display of claim 11 wherein the circular notch polarizer is tuned to efficiently polarize light inefficiently polarized or unpolarized by the dichroic sheet color polarizers.

13. A subtractive color liquid crystal display comprising:
tuned illumination means comprising a triband tuned light source; and a plurality of picture elements, each of said picture elements comprising:

first, second, and third active switching elements aligned relative to said illumination means, which selectively rotate polarization of incident light from said illumination means;

a first entrance notch polarizer adjacent to the first switching element which polarizes a narrow band of light of the first primary color (red, green, and blue);

a first exit notch polarizer adjacent to the first switching element which blocks or passes light of the first primary color depending on the rotation imparted on the light by the first switching element;

a second entrance notch polarizer adjacent to the second switching element which polarizes a narrow band of light of a second primary color;

a second exit notch polarizer adjacent to the second switching element which blocks or passes light of the second primary color depending on the rotation imparted on the light by the second switching element;

a third entrance notch polarizer adjacent to the third switching element which polarizes a narrow band of light of the third primary color; and a third exit notch polarizer adjacent to the third switching element which blocks or passes light of the third primary color depending on the rotation imparted on the light by the third switching element.

14. The subtractive liquid crystal display of claim 13 wherein the triband light source is a trio of lasers each of which emits light of a narrow bandwidth and high intensity for each of the primary colors.

15. A subtractive color liquid crystal display comprising:
tuned illumination means comprising a filter tuned broadband light source; and a plurality of picture elements, each of said picture elements comprising:

first, second, and third active switching elements aligned relative to said illumination means, which selectively rotate polarization of incident light from said illumination means;

a first entrance notch polarizer adjacent to the first switching element which polarizes a narrow band of light of the first primary color (red, green, and blue);

a first exit notch polarizer adjacent to the first switching element which blocks or passes light of the first primary color depending on the rotation imparted on the light by the first switching element;

a second entrance notch polarizer adjacent to the second switching element which polarizes a narrow band of light of a second primary color;

a second exit notch polarizer adjacent to the second switching element which blocks or passes light of the second primary color depending on the rotation imparted on the light by the second switching element;

a third entrance notch polarizer adjacent to the third switching element which polarizes a narrow band of light of the third primary color; and a third exit notch polarizer adjacent to the third switching element which blocks or passes light of the third primary color depending on the rotation imparted on the light by the third switching element.

16. The subtractive liquid crystal display of claim 15 wherein the filter tuned illumination means is tuned by a plurality of the notch polarizers which filter predetermined portions of the spectrum between the primary colors.

17. A subtractive color liquid crystal display comprising:
illumination means comprising a triband tuned light source; and a plurality of stacked liquid crystal color filters each subtracting a particular primary color (red, green, blue), each filter includes a plurality of picture elements which are comprised of:

at least one entrance circular notch polarizer tuned relative to said illumination means to polarize one of the primary colors;

a liquid crystal switching element to selectively rotate light from the illumination means through a known angle; and at least one exit circular notch polarizer tuned relative to said illumination means to either block or pass the same one of the primary colors depending on the rotation selectively imparted on the light by the liquid crystal switching element.

18. The subtractive liquid crystal display of claim 17 wherein the triband light source is a trio of lasers each of which emits light of a narrow bandwidth and high intensity for each of the primary colors.

19. A subtractive color liquid crystal display comprising:

illumination means comprising a filter tuned broadband light source with tuned lamp peaks; and a plurality of stacked liquid crystal color filters each subtracting a particular primary color (red, green, blue), each filter includes a plurality of picture elements which are comprised of:

at least one entrance circular notch polarizer tuned relative to said illumination means to polarize one of the primary colors;

a liquid crystal switching element to selectively rotate light from the illumination means through a known angle; and at least one exit circular notch polarizer tuned relative to said illumination means to either block or pass the same one of the primary colors depending on the rotation selectively imparted on the light by the liquid crystal switching element.

20. The subtractive liquid crystal display of claim 19 wherein the filter tuned illumination means is tuned by a plurality of cross linked notch polarizer pairs which filter predetermined portions of the spectrum to define the bandwidth and location of the primary colors.

* * * * *